United States Patent Office 3,365,291
Patented Jan. 23, 1968

3,365,291
PROCESS FOR PRODUCING GLASS/METAL COMPOSITIONS
Emile Plumat, Gilly, Belgium, assignor to
Glaverbel, Brussels, Belgium
No Drawing. Filed Mar. 2, 1966, Ser. No. 531,030
Claims priority, application Luxembourg, Apr. 28, 1965,
48,493
17 Claims. (Cl. 75—206)

ABSTRACT OF THE DISCLOSURE

A process for preparing a composition of matter comprising intermixed glass and metal and a composition of matter so produced, said process comprising reducing in situ at least one metalliferous compound to metal in a mixture of said metalliferous compound with glass, with subsequent subjecting of the mixture to a sintering operation. In addition, the metalliferous compound can be one which is capable of being converted to the metallic oxide and such metallic oxide is formed prior to reduction to the metal and subsequent sintering.

---

The present invention relates to processes for preparing compositions of solid matter comprising intermixed bonded glass and metal, and to compositions obtained thereby. More particularly, the present invention relates to such process and composition wherein reducible metalliferous compounds are employed.

Compositions of glass and metal have been of great interest because they can combine advantageous properties attributable to metal and glass separately, with other characteristics peculiar to the compositions. Thus, for example, it is possible to prepare glass/metal compositions having a strength comparable to the metal constituent and a resistance to oxidation as high as that of the glass. On the other hand, the decorative appearance which can be obtained with many such compositions renders them suitable for various architectural purposes. Moreover, by suitable choice of the glass and of the metal, it is possible to prepare compositions with properties making them suitable for the fabrication of various special components, such as highly resistant machine parts, electrically conductive components or ornamental objects.

It is well known that glass/metal compositions can be made by pulverizing glass and metal and sintering the powder mixture, i.e., by subjecting the mixture to pressure and firing it, the pressure and temperature conditions depending on the actual constituent materials used. However, it is generally extremely difficult to prepare fine metal powders suitable for such process and their price very unfavorably affects the cost of glass/metal compositions produced in this manner. Moreover, it is not easy to achieve an intimate mixture of the glass and metal powders such that the final composition is free from heterogeneities which are detrimental to the properties of the composition. In addition, many metals do not adhere well to glass, so that the choice of the materials for use in this known process is necessarily limited.

It has now been found, however, that a process can be employed utilizing a particulate glass including fibers and a reducible metalliferous compound that eliminates the disadvantages associated with the afore-mentioned known process.

It is therefore a primary object of the present invention to provide a process for producing a glass/metal composition which does not possess the inherent disadvantages of hitherto employed processes.

It is still a further object of the present invention to provide a process for producing a glass/metal composition which comprises reducing in situ a reducible metalliferous compound in admixture with a glass constituent.

It is yet a further object of the present invention to provide a process for producing a glass/metal composition which comprises converting a metalliferous salt to the oxide with subsequent reduction of the oxide in admixture with a glass constituent.

Yet a further object of the present invention is to provide a process in which the admixture of metal and glass is sintered at a temperature below the melting point of the metal or alternatively, in which the composite is produced by completely melting the metal component in admixture with the glass constituent.

Still a further object of the present invention is to provide an improved metal/glass composition and manufactured articles produced wholly or partially from such composition.

Still further objects and advantages of the process of the present invention will become more apparent from the following more detailed description of the invention.

According to the present invention, a composition of solid matter comprising intermixed glass and metal is formed by reducing at least one metalliferous compound in situ in a mixture of such compound with the glass, and subjecting the mixture to sintering conditions during and/or subsequent to such reduction.

Any metalliferous compound can be used. In general, the metal that is employed is one that is usually regarded as heavy although the present invention is not to be limited to these. Thus, for example, representative metals that can be employed are such as tin, nickel, copper, iron, chromium, lead, cadmium, zinc, titanium, vanadium, molybdenum, tungsten, aluminum, silver, gold, cobalt, etc. It is also be be recognized that these and similar metals can be employed singly or as mixtures of two or more in the reducible metalliferous compound. Thus, for example, the metalliferous compound can comprise a single metallic oxide or salt, a mixture of metal oxides or salts having the same anion portion or a mixture of different oxides or salts of different metals. It is also within the scope of the present invention to employ a mixture of metal oxides or salts having the same metallic cation.

With respect to the anion portion of the metalliferous compound, such compound is generally employed as an oxide or other suitable reducible anion. Non-limitative examples of such suitable reducible metalliferous compounds are the oxides, halides, particularly the chlorides, sulphides, sulphates, nitrates, etc.

Again, it should be borne in mind that various mixtures of different metallic cations and different reducible anions can be advantageously employed in carrying out the processes of the present invention.

By reducing a metalliferous compound in finely divided form and intimately mixed with powdered or crushed glass, the metal itself is normally obtained in the form of very fine particles dispersed through the mass of glass powder, or even, depending on the relative quantities of glass and metal, in the form of a susbtantially uniform film or matrix enveloping and adhering to the glass particles. In general, when carrying out the invention as will hereafter be exemplified, it appears that the reduced metal is distributed through the mass more uniformly than the metalliferous compound subjected to the reduction.

In carrying out the present invention, a metalliferous compound can be selected with a density similar to that of the glass. Also, such compound can be added to the glass in the form of a powder which has a particle size which is also similar to that of the glass. These two factors favor the realization of a homogeneous mixture and their employment is thereby preferred.

Thus far, reference has been made to the mixing of the glass and metalliferous compound while the latter is in solid finely divided form. It is not, however, essential for the metalliferous compound to be in solid form when it is mixed with the glass. As an alternative, the metalliferous compound can be in molten state or it can be dissolved in a liquid medium and the glass particles can be coated with such melt or solution. As a further alternative, the metalliferous compound can in suitable cases, be vaporized and the vapor can be condensed on the surfaces of the glass particles. It will be apparent that when the metalliferous compound is in a fluid state, it can readily diffuse between the glass particles and completely coat such particles. In this way, a very uniform dispersion of the metalliferous compound through the finely divided glass can be obtained.

According to another procedure, the glass particles can be coated with a liquid in which the metalliferous compound is dispersed in the form of a gel or in the form of a colloidal suspension. This method can be advantageously used for intimately mixing the glass with a metalliferous compound which is insoluble or not easily dissolved. Thus, even if it is desired to mix the glass with the metalliferous compound in a liquid medium, the choice of metals is by no means limited to those which form soluble salts. In the case of suspensions, the particles are of very small dimensions and their diffusion through a mass of glass is promoted by the flow of the liquid phase.

In general, metalliferous compounds that are useful in carrying out the present invention adhere very well to the glass particles. Moreover, in the course of the reduction, the metal itself adheres well to the glass even though it may be a metal which could not normally adhere well to the glass if such metal were added in the pure metallic form. Although we do not wish to be bound to any particular theory for this unusual adherence, it is apparently due to some physical or chemical interaction at the contact surfaces.

With respect to the reducible metalliferous compounds that can be employed, the metal oxides are preferred.. Therefore, if a metalliferous compound other than an oxide, e.g., a metal salt such as the chloride, sulfide, sulfate, etc., is a readily available starting material, it is usually advantageous first to convert this compound into a metal oxide and then to reduce the oxide to the metallic state. If desired, this conversion to the oxide may be effected prior to mixing with the glass particles, but is preferably carried out after mixing the initial metalliferous compound with the glass. Thus the initial metalliferous compound is advantageously converted into a metal oxide by heating the mixture of glass particles and metalliferous compound to a temperature at which the latter decomposes. Preferably, the mixture is heated in an oxidizing atmosphere to which water vapor may be added. The initial metalliferous compound may in some cases be converted into an oxide, while in a vapor state, so that the oxide becomes condensed onto the glass particles.

When preparing a metal oxide from another metalliferous compound, it is preferred where possible, to effect the conversion by hydrolysis since hydrolysis can be performed very simply. This procedure is particularly of interest when starting with metal salts which lend themselves readily to hydrolysis. Various chlorides can serve as hydrolyzable salts and among these the chlorides of tin, nickel, copper, iron, chromium, lead, cadmium and zinc are particularly suitable.

For reducing the metalliferous compound initially mixed with the glass, or a metalliferous compound into which such initial compound is subsequently converted in situ, the mixture of glass and compound to be reduced can be heated in the presence of an appropriate reducing agent, preferably a gas. By this means rapid and complete reaction can be achieved without leaving any solid residue other than the required metal. Carbon monoxide and hydrogen are suitable reducing gases. Hydrogen is particularly preferred because it is extremely powerful as a reducing agent and because it is very diffusible into the mass to be reduced. The particular reducing agent used in any such case can obviously be chosen to suit the compound to be reduced.

The sintering of the glass particles and the metal can be achieved by subjecting them to a high pressure with heat. The pressure and the heat can be applied to the mixture successively or simultaneously. Preferably the heating necessary for the sintering is carried out so that the reduction of the metal compound to metal, takes place during this step. This combination of the two operations is preferred because it is quite simple and very economical.

It is not always necessary (although it is preferable) for the temperature of the mixture during the sintering to rise above the softening temperature of the glass. In some cases, e.g., when using titanium compounds, some type of interaction occurs with the glass well below its softening temperature. In any case, the temperature during sintering should be below the melting point of the metal.

In some cases, unless the glass is devitrified in a preliminary operation before mixing it with the metalliferous compound, it may be desirable to bring about crystallization of at least part of the glass in the course of fabricating the glass/metal product. This is especially true since the partial or total crystallization of the glass grains very appreciably improves the mechanical properties of the finished product. Such crystallization can be brought about by keeping the agglomerated materials at a sufficiently elevated temperature for a sufficient length of time. As heat will be applied in any case for bringing about the reduction of a compound to metal in situ and for sintering the metal and glass constituents, the process is preferably controlled so that the required crystallization occurs at least in part in the course of such heating stage, or in the course of at least one of such heating stages if there is more than one.

Since the crystallization of glass often takes many minutes or even some hours, according to the temperature chosen it is therefore desirable for this crystallization to be already progressed during the preliminary heating stages so as to reduce the total time necessary for manufacturing the product. As already mentioned, the metalliferous compound may diffuse into the glass grains. Similarly, reduced metal may also diffuse into the glass and on such diffusion into the superficial layers of the glass grains, these substances can serve as nucleation and crystallization agents.

With respect to this diffusion of the metal, it may be desirable to cause at least one metal oxide to diffuse into the glass particles. An oxide may be used which is capable of diffusing into the glass and of promoting the crystallization of the glass particles along with an improvement of the adherence of the reduced metal to the glass. Among the oxides capable of such crystallization promotion and metal adherence are the oxides of lithium, silver and copper.

In carrying out the present invention, a body capable of releasing gas when heated may be added to the mixture of glass powder and metalliferous compound for the purpose of forming a multitude of bubbles in the mixture and producing a cellular structure in the final product. In this way it is possible to produce a light weight and insulating material with good mechanical strength. A preferred way of forming a cellular product comprises simultaneously reducing the metalliferous compound and agglomerating the metal and the glass so that the cells are formed by bubbles of gas released during the reducing reaction. This procedure is particularly simple and inexpensive and has the advantage that no supplementary substance need be added to the mixture.

In the foregoing description, it has been assumed that the glass which is sintered with the metal is in a crushed or pulverized form; therefore, reference has been made to glass particles, e.g., glass powder. The form of the glass particles is not critical, however, and the glass may advantageously be employed in other forms, e.g., fibers or spheroids, etc.

The present invention also includes glass/metal compositions repared by the process of the invention described above, and also includes shaped articles of manufacture formed wholly or in part from such compositions. Compositions according to the invention can, for example, be used in the manufacture of architectural components, machine parts, electrically conductive elements and particularly, heating resistors. The constituents and their relative proportions can, in any particular case, be chosen with a view to conferring on the product the requisite properties having regard to its intended use; thus, for instance, the electrical conductivity of the composition will increase with an increase in the proportion of metal in the mixture.

Although the present invention is not limited to any particular type of glass, glasses which are particularly preferred in the manufacture of compositions according to the present invention are soda-lime glasses comprising essentially (by weight): 70 to 75% $SiO_2$, 0 to 3% $Al_2O_3$, 12 to 18% $Na_2O+K_2O$, 6 to 12% CaO and 0 to 5% MgO. Other glasses which are particularly suitable comprise (by weight): 50 to 65% $SiO_2$, 5 to 25% $Al_2O_3$, 15 to 28% CaO, 0 to 15% MgO, 0 to 6% $Na_2O+K_2O$, 0 to 6% $B_2O_3$ and 0 to 3% $TiO_2$. Other glasses such as the phosphate glasses, etc., can also be advantageously employed in the process of the present invention.

Although the foregoing description has related to the process according to the present invention wherein the glass and metal are bonded together by sintering at a temperature insufficient to melt or at least no higher than a temperature that will produce a superficial melting of the metal component, it is also possible to employ a temperature high enough to cause complete melting of the metal with subsequent solidification and bonding to the glass. Such a procedure, although it produces the desired result of the present invention, is not preferably employed in view of the economic disadvantage of the use of the increased temperature.

The following specific examples illustrate the various embodiments of the present invention. It is to be understood that such examples are for purposes of illustration only, and the scope of the present invention is not to be limited thereby.

*Example 1*

For manufacturing a composition according to the invention, a soda-lime glass was used having the following composition, the percentages by weight:

| | Percent |
|---|---|
| $SiO_2$ | 72 |
| $Al_2O_3$ | 1 |
| $Na_2O$ | 14 |
| CaO | 9 |
| MgO | 4 |

As the metalliferous compound, copper sulphate was employed. The glass and metalliferous constituents were crushed until all particles had a diameter below 60μ. The constituents were then mixed and gradually heated, the temperature of the mixture being maintained at a temperature of 650° C. for one hour in an atmosphere of hydrogen. In the course of this operation, the glass particles became completely enveloped by reduced copper. After cooling the composition, it was shaped and subjected to a presure of 350 kg./cm.² The shaped and compressed composition was then heated in an atmosphere of hydrogen at a temperature of 750° C. for one hour in order to sinter the composition. This operation was effected in a reducing atmosphere in order to avoid reoxidation of the copper.

*Example 2*

Example 1 was repeated except that the treated mixture was heated to a temperature sufficient to completely melt the metal constituent. After solidification, a product of similar quality as that produced in Example 1 was found to result.

*Example 3*

A glass powder was used, the glass having the following chemical composition (the percentages being by weight):

| | Percent |
|---|---|
| $SiO_2$ | 61 |
| $Al_2O_3$ | 10 |
| CaO | 15 |
| MgO | 5 |
| $Na_2O$ | 4 |
| $B_2O_3$ | 4 |
| $TiO_2$ | 1 |

The metalliferous compound chosen was nickel chloride.

The constituents were crushed until all the particles had a diameter below 60μ. The glass and metalliferous particles were then intimately mixed and treated as described in Example 1, except that the sintering was performed at a temperature of 800° C.

*Example 4*

Powdered glass of the same composition as in Example 1 was used. To a given weight of this glass powder was mixed a concentrated solution of copper sulphate, containing the same weight of salt. The mixture was then dried and subjected to the same treatment as the mixture in Example 1. The resulting product had a very homogeneous texture. Such a composition is particularly suitable, on account of its copper color, for making ornamental pieces.

*Example 5*

A glass was used having the following composition (the percentages being by weight):

| | Percent |
|---|---|
| $SiO_2$ | 50 |
| $Al_2O_3$ | 15 |
| CaO | 25 |
| MgO | 5 |
| $Na_2O$ | 5 |

Iron sulphate was used as the metallifereous compound.

The glass and the iron sulphate were crushed until the grains were below 125μ. The constituents were then mixed in the proportion of 45 parts of glass powder to 55 parts of iron sulphate powder. The metal salt was then reduced by heating for one hour at a temperature of 650° C. in hydrogen. The mixture was then shaped and subjected to a pressure of 750 kg./cm.² After this operation, the shaped pieces were heated at a temperature of 800° C. for one hour in a neutral atmosphere composed of pure and dry nitrogen. The mechanical properties of such a product were improved by performing a second heat-treatment at a temperature of at least 900° C., for at least one hour. This heat-treatment had the effect of devitrifying the glass. In order to facilitate the devitrification, lithium sulphate was added to the initial mixture in a proportion of 1% by weight. The alkali metal diffused into the glass in the course of the sintering process and accelerated the ultimate divitrification.

*Example 6*

A copper sulphide gel was prepared by blowing a current of hydrogen sulphide into a solution of copper chloride. The dimensions of the copper sulphide particles were of the order of 1µ. A glass was employed having the following basic composition (the percentages being by weight):

| | Percent |
|---|---|
| $SiO_2$ | 58 |
| $Al_2O_3$ | 15 |
| CaO | 15 |
| MgO | 12 |

This glass was crushed to a size below 125µ.

The glass and the copper sulphide were intimately mixed, 60 parts of glass powder being used per 40 parts of copper sulphide. The mixture was subsequently dehydrated and the copper sulphide was oxidized by heating the mixture in humid air. The temperature of the mixture was then raised to 700° C. in hydrogen, these conditions being maintained for one hour. This treatment reduced the metalliferous compound to metallic copper. After cooling, the mixture was shaped and subjected to a pressure of 500 kg./cm.²; the shaped pieces thus obtained were sintered by heating to 800° C. in a reducing atmosphere, and then cooled.

*Example 7*

A fine dispersion of iron oxide in water was prepared by treating a solution of ferric chloride with ammonium carbonate. The reaction occurred as follows:

$$2FeCl_3+3(NH_4)_2CO_3=6NH_4Cl+Fe_2(CO_3)_3$$
$$Fe_2(CO_3)_3 \rightarrow Fe_2O_3+3CO_2$$

A glass powder of a composition and characteristic similar to that used in the Example 6 was used. After intimately mixing the constituents, the iron oxide was reduced by bringing the mixture to a temperature of 800° C. and keeping it in a hydrogen atmosphere. The mixture was then shaped and subjected to a pressure of 500 kg./cm.². The pieces obtained were placed in a neutral atmosphere, composed of argon, and subjected to a temperature of 900° C. for about one hour.

*Example 8*

A glass was used having the following basic composition (the percentages being by weight):

| | Percent |
|---|---|
| $SiO_2$ | 52 |
| $Al_2O_3$ | 25 |
| CaO | 9 |
| MgO | 14 |

This glass was pulverized to a particle size smaller than 125µ.

The glass powder was then mixed with nickel chloride dissolved in ethyl alcohol in a proportion of 80 parts of glass powder to 20 parts of nickel salt. The mixture was then shaped and subjected to a pressure of 1000 kg./cm.². The pieces thus obtained were then heated in hydrogen at a temperature of 650° C. in order to partially reduce the nickel compound. The temperature was then raised to 800° C. for completing the reduction of the nickel compound and the sintering of the product. The product had a cellular structure.

As a modification of this example, the nickel chloride was changed into an oxide by hydrolysis by treating the mixture with water before shaping the mixture and heating it before reducing the oxide and sintering the product.

It will be understood that the above description of the present invention is susceptible to various modifications, changes, and adaptations, and the same are intended to be comprehended within the meaning and range of equivalents of the appended claims.

What is claimed is:

1. A process for preparing a composition of matter consisting essentially of intermixed glass and metal wherein said glass forms a matrix for the dispersed metal, which process comprises: (1) reducing in situ at least one metalliferous compound to metal in a mixture of said metalliferous compound with particulate glass; (2) subjecting said mixture to a temperature sufficient to melt said metal; and (3) subsequently solidifying the intermixed glass and metal whereby a firm bond between said glass and metal is produced.

2. The process of claim 1 wherein the glass is present in the mixture in the form of particles.

3. The process of claim 1 wherein said particulate glass is coated with a liquid phase comprising said metalliferous compound in a state selected from the molten and dissolved states of said metalliferous compound, so as to form the said mixture.

4. The process of claim 1 wherein said metalliferous compound is condensed from the vapor phase onto said particulate glass so as to form said mixture.

5. The process of claim 1 wherein said particulate glass is coated with a liquid in which said metalliferous compound is dispersed in a form selected from a gel and a colloidal suspension so as to form said mixture.

6. The process of claim 1 wherein said metalliferous compound is a metallic oxide.

7. The process of claim 1 wherein the said metalliferous compound is a metallic salt capable of being converted into a metallic oxide and said salt is converted to the metallic oxide in situ by heating to a temperature at which the salt decomposes prior to the reduction of the oxide formed.

8. The process of claim 7 wherein said conversion is effected by heating the mixture of particulate glass and metalliferous salt in an oxidizing atmosphere.

9. The process of claim 8 wherein water vapor is introduced into said oxidizing atmosphere.

10. The process of claim 1 wherein said metalliferous compound is a metallic salt capable of being converted into a metallic oxide and said salt is converted to the metallic oxide by hydrolysis prior to the reduction of the oxide formed.

11. The process of claim 2 wherein at least one metal oxide diffuses into the glass.

12. The process of claim 11 wherein said metal oxide is one capable of promoting crystallization of the glass.

13. The process of claim 1 wherein said mixture is subjected to a temperature sufficient to cause crystallization of a portion of the glass.

14. The process of claim 1 wherein said mixture subjected to sintering conditions includes at least one substance which releases gas during the heating.

15. The process of claim 1 wherein said particulate glass comprises by weight:

| | Percent |
|---|---|
| $SiO_2$ | 70 to 75 |
| $Al_2O_3$ | 0 to 3 |
| $Na_2O+K_2O$ | 12 to 18 |
| CaO | 6 to 12 |
| MgO | 0 to 5 |

16. The process of claim 1 wherein said particulate glass comprises by weight:

| | Percent |
|---|---|
| $SiO_2$ | 50 to 65 |
| $Al_2O_3$ | 5 to 25 |
| CaO | 15 to 28 |
| MgO | 0 to 15 |
| $Na_2O+K_2O$ | 0 to 6 |
| $B_2O_3$ | 0 to 6 |
| $TiO_2$ | 0 to 3 |

17. A process according to claim 1 wherein the glass is present in said mixture in the form of fibres.

References Cited

UNITED STATES PATENTS

| | | | |
|---|---|---|---|
| 2,404,598 | 7/1946 | Sachse | 75—206 X |
| 3,019,103 | 1/1962 | Alexander | 75—206 |
| 3,038,248 | 6/1962 | Kremer. | |
| 3,044,867 | 7/1962 | Edstrom | 75—206 X |
| 3,069,292 | 12/1962 | Alexander. | |
| 3,103,722 | 9/1963 | Whitehurst. | |
| 3,158,473 | 11/1964 | Gatti | 75—206 |
| 3,167,427 | 1/1965 | Slayter | 75—206 |
| 3,218,135 | 11/1965 | Alexander | 75—212 X |
| 3,271,142 | 9/1966 | Hammond | 75—206 |
| 3,295,934 | 1/1967 | Bre | 75—206 X |
| 3,206,702 | 9/1965 | Greenwood | 29—620 X |
| 3,218,262 | 11/1965 | de Lajarte | 252—301.1 |
| 3,271,193 | 9/1966 | Boykin | 106—54 X |
| 3,274,669 | 9/1966 | Place | 29—620 |

FOREIGN PATENTS

| | | |
|---|---|---|
| 837,013 | 6/1960 | Great Britain. |
| 893,424 | 4/1962 | Great Britain. |
| 919,052 | 2/1963 | Great Britain. |

L. DEWAYNE RUTLEDGE, *Primary Examiner.*

BENJAMIN R. PADGETT, *Examiner.*

A. J. STEINER, *Assistant Examiner.*